US006912351B1

(12) United States Patent
Kim

(10) Patent No.: US 6,912,351 B1
(45) Date of Patent: Jun. 28, 2005

(54) METHOD AND DEVICE FOR CONDENSED IMAGE RECORDING AND REPRODUCTION

(75) Inventor: Young-Chul Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/174,542

(22) Filed: Oct. 19, 1998

(30) Foreign Application Priority Data

Jan. 6, 1998 (KR) .............................................. 98-20293

(51) Int. Cl.[7] .............................................. H04N 5/917
(52) U.S. Cl. .................. 386/111; 386/125; 375/240.03
(58) Field of Search .............................. 386/46, 70, 68, 386/95, 109, 125, 126, 1, 33, 38, 111–112, 45, 117; 348/143, 151, 149–155; 375/240.03, 240.01, 240.12

(56) References Cited

U.S. PATENT DOCUMENTS

| 5,144,425 | A | * | 9/1992 | Joseph .................. 375/240.05 |
| 5,247,363 | A | * | 9/1993 | Sun et al. ................... 348/616 |
| 5,267,039 | A | * | 11/1993 | Elberbaum .................. 348/143 |
| 5,526,133 | A | * | 6/1996 | Paff ........................... 348/153 |
| 5,535,008 | A | * | 7/1996 | Yamagishi et al. .......... 386/109 |
| 5,621,840 | A | * | 4/1997 | Kawamura et al. ........... 386/68 |
| 5,649,047 | A | * | 7/1997 | Takahashi et al. .......... 386/111 |
| 5,671,009 | A | * | 9/1997 | Chun ......................... 348/153 |
| 5,751,893 | A | * | 5/1998 | Shimoda et al. ............ 386/111 |
| 5,870,139 | A | * | 2/1999 | Cooper et al. .............. 348/153 |
| 5,946,447 | A | * | 8/1999 | Nakagawa et al. ........... 386/95 |
| 5,949,953 | A | * | 9/1999 | Shirakawa et al. ........... 386/70 |
| 5,978,018 | A | * | 11/1999 | Sakui .......................... 348/151 |
| 5,995,140 | A | * | 11/1999 | Cooper et al. .............. 348/153 |
| 6,016,382 | A | * | 1/2000 | Yamagishi et al. .......... 386/109 |
| 6,021,250 | A | * | 2/2000 | Hyodo et al. ................ 386/95 |
| 6,104,441 | A | * | 8/2000 | Wee et al. .................. 386/111 |
| 6,115,420 | A | * | 9/2000 | Wang .................... 375/240.03 |
| 6,118,817 | A | * | 9/2000 | Wang .................... 375/240.03 |

FOREIGN PATENT DOCUMENTS

JP 9093592 * 4/1997
JP 9322154 * 12/1997

* cited by examiner

Primary Examiner—Tho Tran
Assistant Examiner—Christopher Onuaku
(74) Attorney, Agent, or Firm—Birch, Stewart, Kolasch & Birch, LLP

(57) ABSTRACT

A method and device for recording data on a recording medium, includes storing, in a memory, image data in frame units; comparing a stored image frame with a subsequent image frame following the stored image frame; and recording, on a recording medium, the subsequent image frame based on a result of the comparison. A method and device for reproducing data recorded on a recording medium, includes receiving a channel selection signal; reproducing image data recorded on a recording medium based on the channel selection signal; determining whether the image data corresponds to predictive-picture (P-picture) data; and generating a full screen image signal based on the image data if the image data does not correspond to P-picture data, or generating a full screen image signal based on intra-picture (I-picture) data corresponding to the image data if the image data corresponds to P-picture data.

23 Claims, 5 Drawing Sheets

METHOD AND DEVICE FOR CONDENSED IMAGE RECORDING AND REPRODUCTION

BACKGROUND OF THE INVENTION

1. Field of the Invention

The present invention relates to a Time Lapse recording and reproducing method for optical disks, and more particularly, to a device and method for recording and reproducing video data on and from an optical disk using a Time Lapse recording/reproduction process.

2. Description of Related Art

Conventional Time Lapse recording devices and methods are generally used in security systems for monitoring and recording activities in security sensitive areas, such as banks or museums. A conventional Time Lapse Video Cassette Recorder (Time Lapse VCR) records and reproduces video signals on and from magnetic tapes.

FIG.1 shows a block diagram of a conventional Time Lapse VCR. As shown therein, the conventional Time Lapse VCR includes an A/D (analog-to-digital) converter 10 for converting an analog image signal input from a camera device, such as a CCD camera, into digital image data; a buffer memory 21 for temporally storing the digital image data therein; a field memory 22 for outputting the digital image data of the buffer memory 21 when the field memory 22 is full; a D/A (digital-to-analog) converter 30 for converting the digital image data output from the field memory 22 into an analog image signal; a recording/reproducing unit 40 for recording the analog image signal on a magnetic tape; an input unit 60 for receiving a user's option or user's selection; and a controller 50 for controlling the read and write operation of the memories 21 and 22 and controlling to store the image data intermittently with a predetermined time interval according to the user input received from the input unit 60.

The controller 50 selects each frame of the image data of the buffer memory 21 with a predetermined time interval which is based on the recording time set by the user's input, and stores each of the frames in the field memory 22. In other words, the controller 50 transfers image data stored in the buffer memory 21 in frame units to the field memory 22. As a result, time-sensitive image data are compressed and stored in the field memory 22 in frame units.

When the field memory 22 is completely full, the controller 50 controls the recording/reproducing unit 40 to begin recording of an analog image signal output from the D/A converter 30. At the same time, the controller 50 continues to store the converted image data in the buffer memory 21. Upon completion of the recording operation, a frame of the image data corresponding to a predetermined time interval is transferred from the buffer memory 21 to the field memory 22 and stored therein. This process is repeated to store an image signal in a Time Lapse manner.

The conventional Time Lapse VCR as described above must forwardly move and stop the tape repeatedly to continuously Time Lapse record the image signal based on the size of the field memory 22. This results in considerable use and wear of the deck and drum of the conventional Time Lapse VCR, so that the drum and deck must be replaced frequently. Furthermore, the magnetic tape on which the image signals are recorded and reproduced deteriorates quickly due to the friction against the heads 2 of the VCR. This affects the quality of image being displayed by the conventional Time Lapse VCR and the life span of the VCR.

SUMMARY OF THE INVENTION

Accordingly, an object of the present invention is to provide a recording method for compressing and intermittently recording image data on a recording medium with a maximum recording capacity.

Another object of the present invention is to provide a reproduction method for reproducing compressed intermittent data from a recording medium.

Briefly described, a method and device for recording data on a recording medium, according to the present invention includes storing, in a memory, image data in frame units; comparing a stored image frame with a subsequent image frame following the stored image frame; and recording, on a recording medium, the subsequent image frame based on a result of the comparison.

A method and device for reproducing data recorded on a recording medium, according to the present invention includes receiving a channel selection signal; reproducing image data recorded on a recording medium based on the channel selection signal; determining whether the image data corresponds to predictive-picture (P-picture) data; and generating a full screen image signal based on the image data if the image data does not correspond to P-picture data, or generating a full screen image signal based on intra-picture (I-picture) data corresponding to the image data if the image data corresponds to P-picture data.

BRIEF DESCRIPTION OF THE DRAWINGS

The present invention will become more fully understood from the detailed description given here-in-below and the accompanying drawings which are given by way of illustration only, wherein like reference numerals designate corresponding parts in the various drawings, and wherein.

DETAILED DESCRIPTION OF THE PREFERRED EMBODIMENTS

A Time Lapse recording/reproduction device according to the present invention intermittently records compressed image data on an optical disc and reproduces the recorded image data with a high operation speed.

Figure 1:
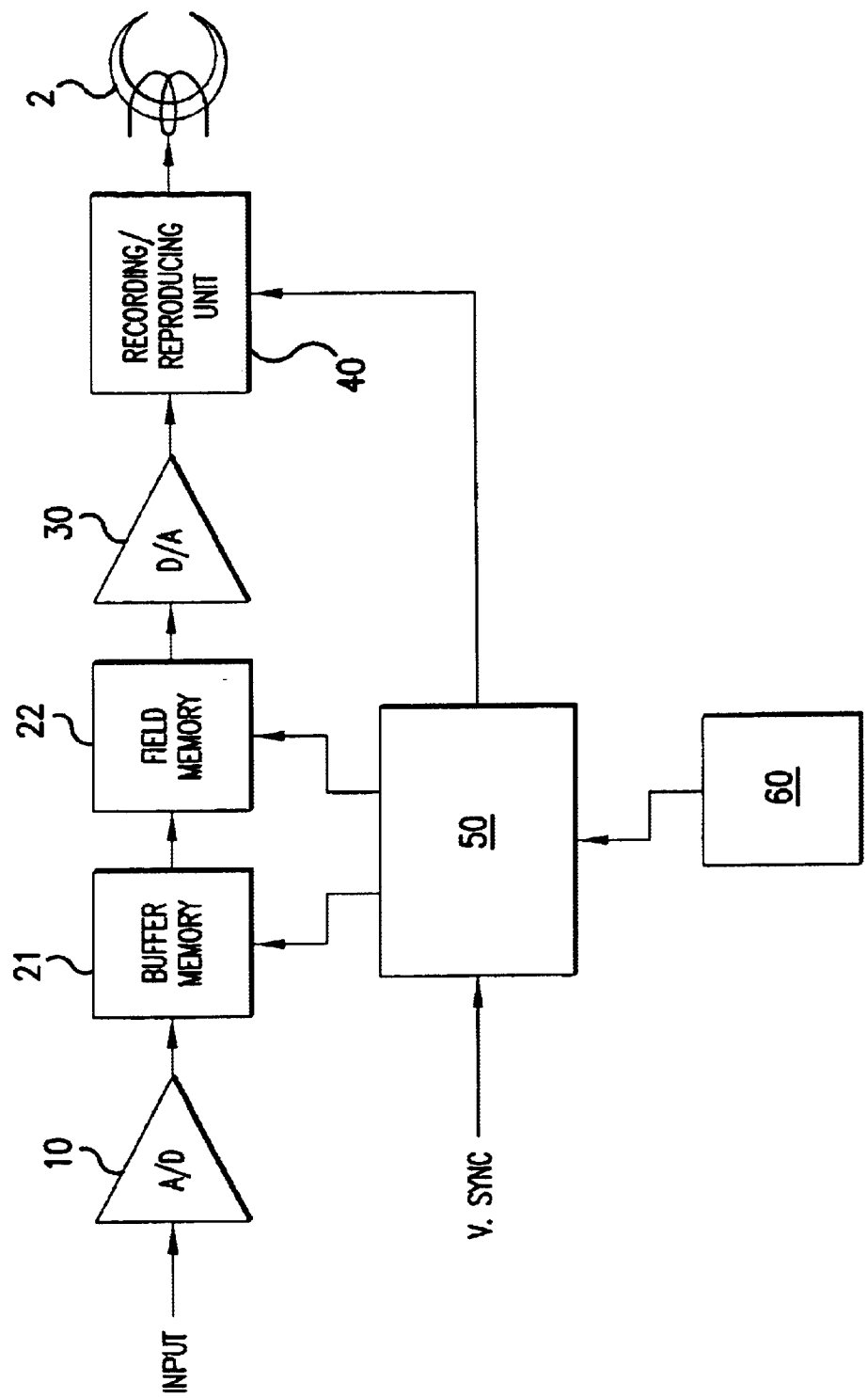
FIG. 1 illustrates a block diagram of a conventional Time Lapse VCR using memory units.
Figure 2:
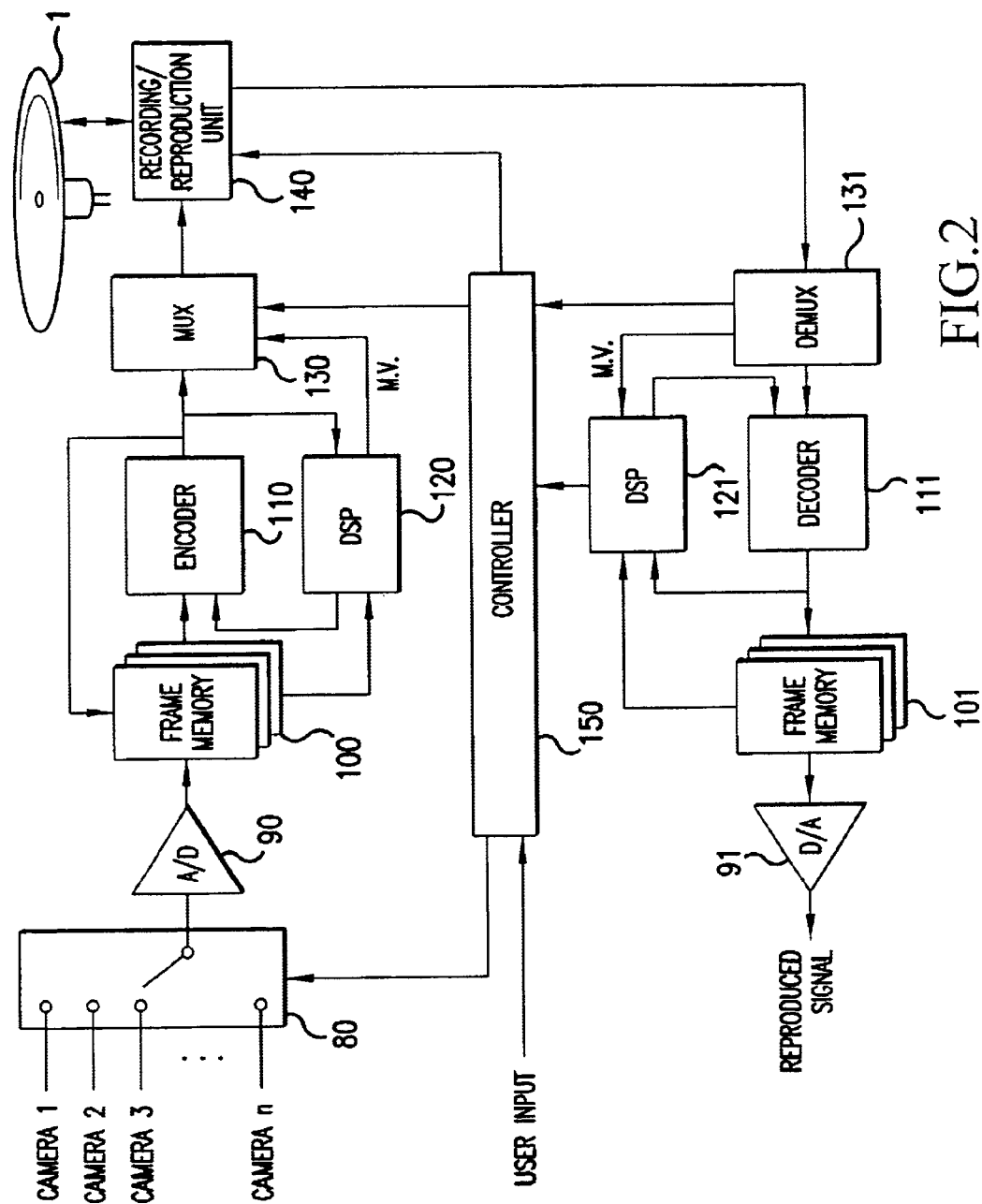
FIG. 2 illustrates a block diagram of a Time Lapse recording apparatus according to an embodiment of the present invention.

FIG. 2 shows a block diagram of a Time Lapse recording/reproduction device according to the present invention. As shown in therein, the Time Lapse recording/reproduction device includes a switch 80 for selecting one of analog image signals inputted in frame units from a plurality of cameras; an A/D converter 90 for converting the selected image signal into digital data by sampling the image signal at a predetermined rate; a plurality of frame memories 100 and 101 for storing therein image data in frame units; an encoder 110 for generating I-picture data or P-picture data in frame units by using transformation and quantization of image data output from the frame memory 100; a recording-digital signal processor (DSP) 120 for extracting moving vectors from the image data output from the frame memory 100 and for generating P-picture data of the compressed image data; a multiplexer 130 (MUX) for multiplexing additional data into the compressed image data of the encoder 110; a record/reproduction unit 140 for recording the multiplexed data onto a recording medium, such as an optical disk 1, and for reproducing the recorded data from the optical disk 1; a demultiplexer (de-MUX) 131 for demultiplexing the reproduced data from the recording/reproducing unit 140 to generate moving vectors and compressed image data; a decoder 111 for performing a reverse-quantization and reverse-transformation of the demultiplexed image data output from the de-MUX 131; a reproducing-DSP 121 for generating original image frames based on the P-picture data output from the decoder 111 and the moving vector output from the de-MUX 131; a D/A converter 91 for converting the reproduced image data into an analog image signal; and a controller 150 for controlling the above-described components based on the commands from the user. The recording/reproduction unit 140 includes video heads for reading and/or writing information on the recording medium. Each of the frame memories 100 and 101 can include a plurality of frame memory units. In addition, other types of memories may be used, instead of the optical disc 1.

Figure 3:
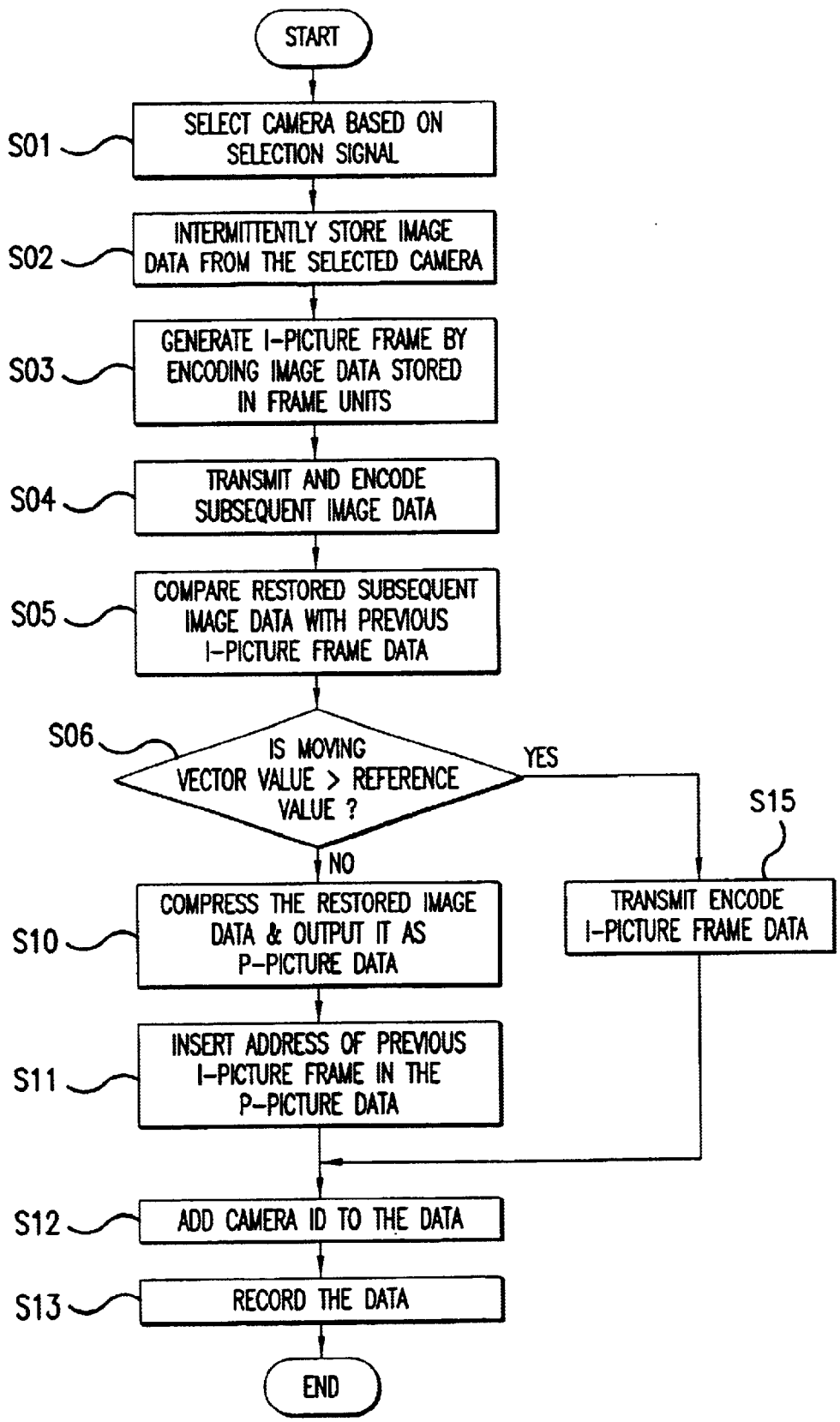
FIG. 3 illustrates a flow chart depicting a recording method for intermittent data according to an embodiment of the present invention.

FIG. 3 illustrates a flow chart depicting a recording method according to an embodiment of the present invention.

As shown therein, in Step S01, the controller 150 receives a channel (camera) selection signal input from the user and switches the connection of the switch 80 to receive an image signal from the selected channel. A plurality of channels (camera) may be selected so that the switch 80 selects the channels sequentially and repeatedly during a predetermined time period. The image signals, which are input from the currently selected camera, are sampled according to the sampling time of the A/D converter 90 for conversion into digital data, and are stored in the frame memory 100 in frame units, in Step S02. That is, image data are intermittently obtained and stored in the frame memory 100 according to the present invention.

In Step S03, the intermittent image data stored in the frame memory 100 are read in frame units and transmitted to the encoder 110. The encoder 110 relocates pixels forming the image data based on each frequency value, and performs a transformation and quantization operation by dividing the pixels by each quantization value variably set according to the frequency features of the relocated pixel areas.

According to the transformation and quantization operation, image data (first image data) is compressed and generated in the form of I-picture frame data (first encoded data) by the encoder 110. The I-picture frame (intra-frame) data carries the entire image information of a frame. The generated I-picture frame data is transmitted to the MUX 130, and also stored in the frame memory 100 until it is updated by another image data according to the process described below.

In Step S04, image data (second image data) subsequently following the image data (first image data) just processed by the encoder 110 is transmitted from the memory 100 and converted into compressed image data (second encoded data) by the encoder 110. This encoded data is input to the recording DSP 120.

In Step S05, the recording DSP 120 receives the encoded data (second encoded data) and generates the image data (second image data) as it existed before the data compression. Then the recording DSP compares the restored image data (second image data) with the prior I-picture or P-picture image data (first encoded data) stored in the buffer memory 100 to generate a moving vector corresponding to changes between these data. In the recording DSP 120, the value of the detected moving vector value is compared with a preset reference value in Step S06.

In Step S10, if the value of the moving vector is less than the reference value (i.e., little change between two frames), the restored frame data (second image data) is output to the encoder 110 as a frame that has much less data than the I-picture frame, e.g., as a P-picture frame in MPEG. This P-picture frame is compressed by the encoder 110, which is then transmitted to the MUX 130.

On the other hand, in Step S15, if the value of the generated moving vector is greater than the reference value, the restored image frame data is not generated as P-picture frame data, but is sent to the MUX 130 as encoded I-picture frame data from the encoder 110.

In Step S11, if the restored image data is output as a P-frame (Step S10), the recording DSP 120 transmits to the MUX 130 the moving vector and the position value of the corresponding (or previous) I-frame, so that the above information is added to the corresponding compressed P-frame output from the encoder 110.

In Step S12, the controller 120 sends to the MUX 130 a camera (channel) identification code signal corresponding to the channel selection by the switch 80, so that the camera ID code is added to a data packet including the corresponding image frame. In Step S13, the MUX 130 selectively outputs the I-picture data (or P-picture data), the camera ID code, and the address of the I-picture data received from the encoder 110, the recording DSP 120 and the controller 150, and generates a bit stream of certain bytes for each frame. These bit streams are transmitted to the recording/reproducing unit 140 which records them on the optical disk 1.

Figure 5A:
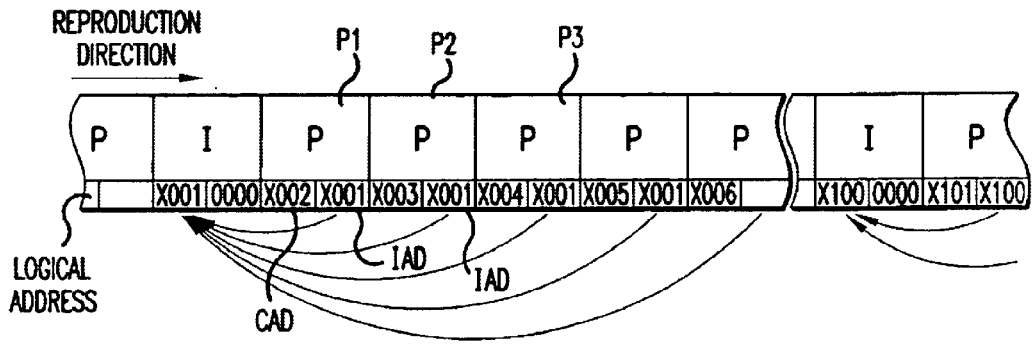
FIGS. 5A and 5B illustrate examples of a logical data structure of a digital data stream compressed and recorded on the optical disk according to the present invention.

The bit stream generated and transmitted to the recording/reproducing unit 140 as described above has a logical structure as shown in, e.g., FIG. 5A. As shown therein, each P-picture frame P1, P2, P3 has a current address CAD indicating the current address of the P-picture, and an I-picture reference address IAD indicating the address of the corresponding (or previous) I-frame. If image signals are obtained from more than one camera, the bit streams generated and transmitted to the recording/reproduction unit 140 can have a logical structure as shown in, e.g., FIG. 5B. In addition to the shown in FIG. 5A, the data stream of FIG. 5B includes a camera (channel) ID code CHID indicating the identification code of each camera or a signal source.

Figure 5B:
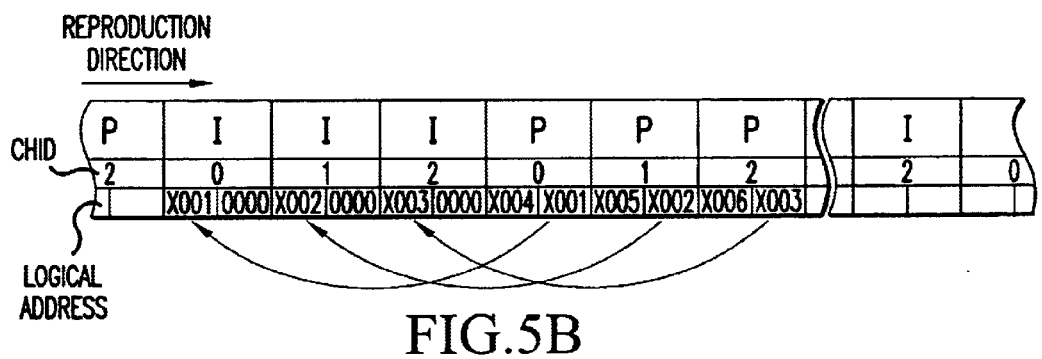
Figure 6:
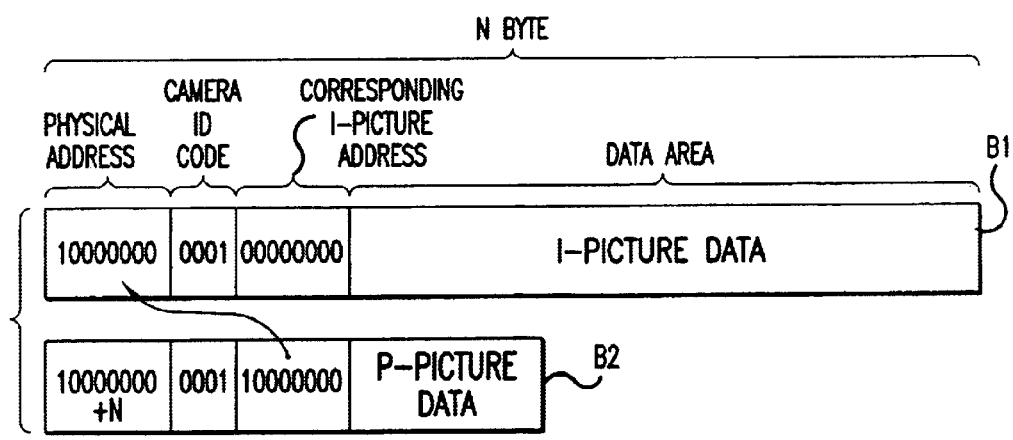
FIG. 6 illustrates an example of a structure of a bit stream recorded on an optical disk according to the present invention.

FIG. 6 shows an example of a data structure of the bit stream shown in FIGS. 5A and 5B to be recorded and reproduced on and from the optical disk medium. As shown therein, the data structure is divided to carry the physical address of the bit stream (1), the camera ID code (2), the address of the corresponding I-picture frame (3), and picture data stored in the picture data area (4). In the first bit stream B1, the I-picture data are stored in the picture data area (4) so that the address of the corresponding I-picture frame (3)

is zero or absent. In the second bit stream B2, the P-picture data are stored in the picture data area (4) so that the address of the corresponding I-picture frame (3) is included in the bit stream. During reproduction, the address of the corresponding I-picture frame (3) is detected to retrieve from that address the corresponding I-picture frame data for the P-picture frame data.

Figure 4:
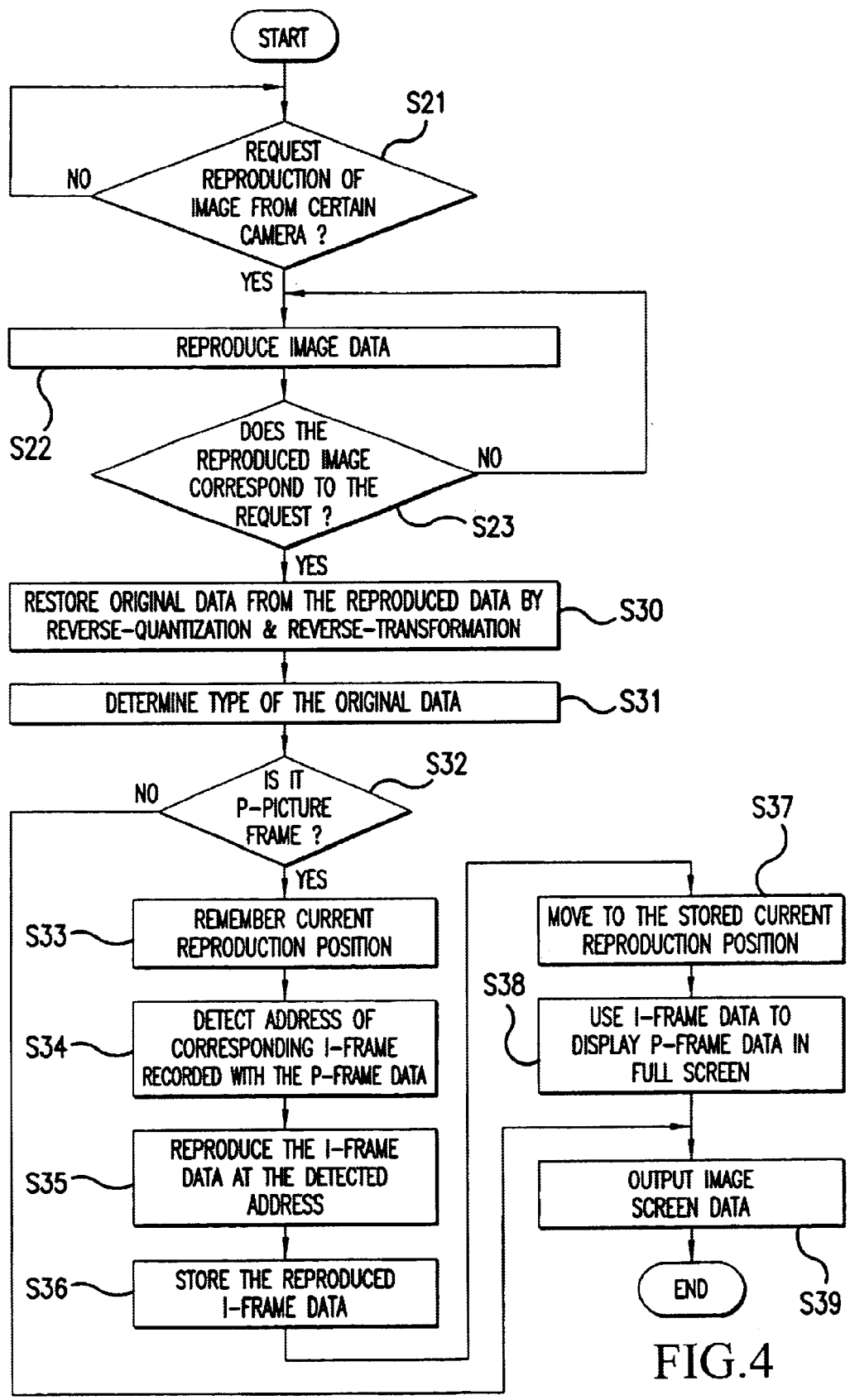
FIG. 4 illustrates a flow chart depicting a reproduction method for reproducing compressed intermittent data recorded on an optical disk according to the present invention.

FIG. 4 illustrates a flow chart depicting a reproducing method for reproducing compressed intermittent data (e.g., as shown in FIG. 6) recorded on a recording medium, such as an optical disk, according to the present invention.

As shown in Steps S21 and S22 of FIG. 4, if the user requests reproduction of an image data from a particular camera or channel among the intermittent image data recorded on the optical disc 1, the controller 150 controls the recording/reproducing unit 140 to reproduce the corresponding image data from the optical disc 1. The image data reproduced from the optical disc 1 is multiplexed data, which is demultiplexed by the de-MUX 131. By demultiplexing, the camera (channel) ID code CHID is separated from the reproduced image data and output to the controller 150. Based on the camera ID code CHID, the controller 150 determines whether or not the reproduced image data corresponds to the selected camera or channel, in Step S23. This ensures that the correct image data is processed to comply with the user's request. If incorrect image data has been reproduced, the controller 150 controls the recording/reproduction unit 140 to reproduce the correct image data from the optical disc 1. In Step S30, the image data corresponding to the user's request is transmitted and decoded in the decoder 111. The decoding process of the decoder 111 involves reverse-quantization and reverse-transformation to restore the original image data prior to data compression carried out during recording. Then the property (type) of the currently restored image data is determined in Step S31 by the reproducing DSP 121, and the determination result is transmitted to the controller 150. More specifically, if the currently restored image data is detected to be P-picture frame data in Step S32, the controller 150 stores the current reproduction position in Step S33. Then in Step S34, the controller 150 detects the address of the corresponding I-picture frame (e.g., data stored in the area (3) of the bit stream B2 shown in FIG. 6) from the reproduced image data output from the de-MUX 131, and reproduces based on the detected address the corresponding (or previous) I-picture frame data recorded on the optical disc 1 by controlling the recording/reproduction unit 140.

In Step S36, the reproduced corresponding I-picture frame data is processed by the reproducing DSP 121, and decoded by the decoder 111 to be stored in the frame memory 101. The controller 150, after Step S36, controls the recording/reproducing unit 140 to move the video heads to the original recording position stored in Step S33.

In Step S38, in the reproducing DSP 121, the P-frame corresponding to the user's request signal is restored as a full screen image (background) using the corresponding I-picture frame data stored in the frame memory 101 and using the moving vectors obtained from the de-MUX 131. Then the full screen image data is reverse-transformed and reverse-quantized by the decoder 111, and stored in the memory 101 as the original image data corresponding to the user's request signal. The full screen image data is converted into an analog image signal by the D/A converter 91 and output as a reproduction signal in Step S39.

On the other hand, in Step S32, if the detected image data is not a P-picture frame, then the detected image data is decoded by the decoder 111 as described above, and output as an analog image signal from the D/A converter 91 in Step S39.

When the image data corresponding to the user's request signal is P-picture frame data, full screen image data can be obtained by retrieving corresponding or prior I-picture frame data based on the I-picture frame address recorded with the P-picture frame data.

According to the present invention, recording and reproduction of data is optimized by compressing an image signal based on whether or not there exists a significant difference between two adjacent frames. As a reuslt, the recording medium can record thereon and reproduce therefrom a signficiantly greater amount of image data compared to conventional recording and reproduction devcies and methods. When the recording and reproduction of a moving picture is carried out by a camera, such as a CCD, a CCTV, etc., only the desired images can be selectively reproduced with high display quality. Further, use of an optical disc permits a faster and more selective access of all image data stored thereon. Moreover, digital recording and reproduction of signals results in an improved picture quality.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A method for recording data on a recording medium, comprising the steps of:

receiving a first image frame and second image frame, wherein the second image frame comprises the difference with respect to the first image frame and wherein the first and second image frames are either intra-picture frames or predictive picture frames; and adding position information data to the second image frame, wherein said position information data includes the address of the first image frame, and is recorded together with said second image frame onto the recording medium.

2. A method for recording data on a recording medium, comprising:

recording an intra frame and a subsequent image frame, wherein the subsequent image frame is comprised of the difference with respect to the intra frame and wherein the subsequent image frame is either an inter picture frame or a predictive picture frame; and adding position information to the subsequent image frame, wherein said position information is recorded on the recording medium with said subsequent image frame, said position information indicating an address of the recorded intra frame.

3. The method of claim 2, wherein said adding position information step includes recording the subsequent image frame as a predictive-picture (P-Picture) frame of a Moving Picture Expert Group (MPEG).

4. A device for recording data on a recording medium, comprising:

a receiving unit for receiving image frames;

a frame memory for storing a first image frame that is either an intra-picture frame or a predictive picture frame;

a digital signal processor for comparing the first image frame stored in the frame memory with a second image frame that is either an intra-picture frame or a predictive picture frame followed by the first image frame; and a recording unit for recording the second image frame onto the recording medium based on a comparison result from the digital signal processor, wherein the recorded second image frame comprises the difference with respect to the first image frame and includes position information that has been added to indicate an address of the first image frame to be used for searching the first image frame, to thereby reproduce the second image frame by referring to the first image frame.

5. A method for reproducing an image recorded on a recording medium, comprising:

reading an image recorded on a recording medium;

determining whether the image corresponds to a predictive picture frame, said predictive picture frame including added position information having an address for indicating a position of an intra picture frame;

reading the intra picture frame based on the position information included with the predictive picture frame; and reproducing the predictive picture frame based on the intra picture frame.

6. Apparatus for reproducing an image recorded on a recording medium, comprising:

a reading unit for reading an image recorded on a recording medium;

a control unit for determining whether the image corresponds to a predictive picture frame, said predictive picture frame including position information which has been added to indicate the address of an intra picture, and controlling the reading unit for reading the intra picture frame based on said position information; and a reproducing unit for reproducing the predictive picture frame based on the intra picture frame.

7. A method for recording data on a recording medium, comprising:

recording a single first image frame and a second image frame on a recording medium frame wherein the first and second image frames are either intra-picture frames or predictive picture frames and wherein the second image frame comprises the difference with respect to the single first image frame; and adding position information to the second image frame, said position information being recorded onto the recording medium along with the second image frame and having the address of the single first image frame.

8. A method of recording data on a recording medium with a camera, comprising:

selecting a camera based a camera selection signal;

intermittently storing image data from the selected camera in frame units;

generating an intra-picture data frame by encoding image stored in frame units;

transmitting and encoding subsequent image data in frame units;

comparing restored subsequent image data with previously stored intra-picture data to generate a moving vector value corresponding to changes between a subsequent image and a previous image;

comparing the generated moving vector value with a reference moving vector value;

if the generated moving vector value is less than the reference moving vector value, compressing the restored image data to create a predictive picture data frame, inserting the address of a previous intra-picture data frame into the predictive picture data frame, and transmitting the predictive picture frame data for recording;

if the generated moving vector value is less than the reference moving vector value, transmitting the intra-picture frame data for recording;

adding camera identification data to the transmitted picture frame data; and recording the transmitted picture frame data.

9. A method of recording data using video heads on a recording medium with a camera, comprising:

reproducing original image data generated by a camera;

restoring original image data from the reproduced image frame data by reverse transformation;

determining whether the original restored image data is intra-picture frame data or predictive picture frame data;

if the restored image data frame is predictive picture frame data, storing the current reproduction position of the restored image frame data, detecting the address of the corresponding intra-picture frame data recorded with the predictive picture frame data, reproducing an image frame based on the intra-picture frame data, storing the reproduced image frame data, moving the video heads to the stored current reproduction position, and using intra-picture frame data to display predictive frame data as full screen image data;

if the original image frame data type is not predictive picture frame data, outputting the non-predictive picture frame data for recording.

10. A system of recording data on a recording medium with a camera, comprising:

a system element that selects a camera based a camera selection signal;

a system element that intermittently stores image data from the selected camera in frame units;

a system element that generates an intra-picture data frame by encoding image stored in frame units;

a system element that transmits and encodes subsequent image data in frame units;

a system element that compares restored subsequent image data with previously stored intra-picture data to a system element that generates a moving vector value corresponding to changes between a subsequent image and a previous image;

a system element that compares the generated moving vector value with a reference moving vector value;

a system element that, if the generated moving vector value is less than the reference moving vector value, compresses the restored image data to create a predictive picture data frame, inserts the address of a previous intra-picture data frame into the predictive picture data frame, and transmits the predictive picture frame data for recording;

a system element that, if the generated moving vector value is less than the reference moving vector value, transmits the intra-picture frame data for recording;

a system element that adds camera identification data to the transmitted picture frame data; and a system element that records the transmitted picture frame data.

11. A system of recording data using video heads on a recording medium with a camera, comprising:
- a system element that reproduces original image data generated by a camera;
- a system element that restores original image data from the reproduced image frame data by reverse transformation;
- a system element that determines whether the original restored image data is intra-picture frame data or predictive picture frame data;
- a system element that, if the restored image data frame is predictive picture frame data, stores the current reproduction position of the restored image frame data, detects the address of the corresponding intra-picture frame data recorded with the predictive picture frame data, reproduces an image frame based on the intra-picture frame data, stores the reproduced image frame data, moves the video heads to the stored current reproduction position, and uses intra-picture frame data to display predictive frame data as full screen image data; and
- a system element that, if the original image frame data type is not predictive picture frame data, outputs the non-predictive picture frame data for recording.

12. A method for decoding predictive coded image data, comprising:
- determining if the image data has a predictive coding;
- wherein predictive coded image data includes identifying information of a reference image frame for specifying a reference image frame among previous image frames;
- detecting the reference image frame based on the identifying information; and
- decoding the image data based on the detected reference image frame.

13. The method of claim 12, wherein the image data is encoded based on comparison with a previous image frame.

14. The method of claim 12, wherein a reference image frame is used for compressing an image frame to predictive coded image data.

15. A system for decoding predictive coded image data, comprising:
- means for determining if the image data has a predictive coding;
- wherein predictive coded image data includes identifying information of a reference image frame for specifying a reference image frame among previous image frames;
- means for detecting the reference image frame based on the identifying information; and
- means for decoding the image data based on the detected reference image frame.

16. The system of claim 15, wherein the means for decoding the image data compares the image data with a previous image frame.

17. The system of claim 15, further comprising means for using a reference image frame to compress an image frame to predictive coded image data.

18. An apparatus for decoding predictive coded image data, comprising:
- an element that determines if the image data has a predictive coding;
- wherein predictive coded image data includes identifying information of a reference image frame for specifying a reference image frame among previous image frames;
- an element that detects the reference image frame based on the identifying information; and
- an element decodes the image data based on the detected reference image frame.

19. The system of claim 18, wherein the element that decodes the image data compares the image with a previous image frame.

20. The system of claim 18, further comprising an element that uses a reference image frame to compress an image frame to predictive coded image data.

21. The method of claim 12, wherein a stream of the image frames has one predetermined time interval.

22. The method of claim 21, wherein each of the image frames has one predetermined sampling rate.

23. The method of claim 12, wherein the reference image frame is a previous image frame which is presented more than two image frames from the image data.

* * * * *